United States Patent
Ault et al.

(10) Patent No.: US 6,192,389 B1
(45) Date of Patent: Feb. 20, 2001

(54) METHOD AND APPARATUS FOR TRANSFERRING FILE DESCRIPTORS IN A MULTIPROCESS, MULTITHREADED CLIENT/SERVER SYSTEM

(75) Inventors: Donald F. Ault, Hyde Park; Jeffrey D. Aman, Poughkeepsie; Ernest S. Bender, Saugerties; Donna N. T. E. Dillenberger, Yorktown Heights; David B. Emmes, Poughkeepsie; Michael G. Spiegel, Monroe, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 08/825,302

(22) Filed: Mar. 28, 1997

(51) Int. Cl.$^7$ ..................................................... G06F 9/00
(52) U.S. Cl. .......................................... 709/101; 709/105
(58) Field of Search ..................................... 709/100–108, 709/200–203, 217–219, 233, 234, 235, 227; 703/27

(56) References Cited

U.S. PATENT DOCUMENTS

| 5,212,793 | 5/1993 | Donica et al. | 709/105 |
| 5,249,290 | 9/1993 | Heizer | 709/105 |
| 5,437,032 | 7/1995 | Wolf et al. | 709/103 |

(List continued on next page.)

FOREIGN PATENT DOCUMENTS

| 694837A1 | 7/1994 | (EP) | G06F/9/46 |

OTHER PUBLICATIONS

*MVS Planning: Workload Management*, IBM Publication GC28–1761–00, 1996.
*MVS Programming: Workload Management Services*, IBM Publication GC28–1773–00, 1996.
"Optimal Control Of A Removable . . . With Finite Capacity", by, Wang et al., Microelectron. Reliab. (UK) vol. 35, No. 7, Jul. 1995, P1023–30.
"Providing Distributed Computing Environment Servers On Client Demand", IBM TDB, vol. 38, No. 3, Mar. 1995, P231–233.
"Queue–Dependent Servers", by V.P. Singh, IBM TR 221301, Jun. 30, 1971.
"Queue Dependent Servers Queueing System", by Garg et al., Microelectron. Reliab. (UK) vol. 33, No. 15, Dec. 1993, P2289–95.

*Primary Examiner*—Alvin E. Oberlay
*Assistant Examiner*—St. John Courteney, III
(74) *Attorney, Agent, or Firm*—William A. Kinnaman, Jr.

(57) ABSTRACT

In a client/server system, a method and apparatus for a listening daemon to distribute work and client connectivity across multiple processes each supporting multiple threads. Upon receiving a request from a client, a listening daemonaccepts the conversation, thus creating a socket. The listening daemon then does a putwork( ) call which places a work request on a system managed work queue. The work request behaves in a manner very similar to spawn in that it provides for parameters to be passed as well as transfer of ownership of the socket. In the meantime, server processes that are created either manually or by the operating system create multiple threads, which invoke a getwork( ) service to retrieve work requests created by the listening daemon. The getwork( ) service transfers the socket to the calling process and notifies the thread which file descriptors it has inherited. The thread is then able to process the client request and respond directly to the client without requiring an intermediate process to provide the communication link. The present invention allows a server in a client/server system to spread the workload across multiple threads in multiple processes, avoiding the creation of too many processes or too many threads in a single process. The direct transfer of the socket eliminates the unnecessary overhead typically required to rebind a new process to the client application.

13 Claims, 5 Drawing Sheets

U.S. PATENT DOCUMENTS

| | | | |
|---|---|---|---|
| 5,473,773 | 12/1995 | Aman et al. | 709/104 |
| 5,504,894 | 4/1996 | Ferguson et al. | 707/2 |
| 5,537,542 | 7/1996 | Eilert et al. | 709/201 |
| 5,603,029 | 2/1997 | Aman et al. | 709/105 |
| 5,619,650 * | 4/1997 | Bach et al. | 709/201 |
| 5,721,876 * | 2/1998 | Yu et al. | 703/27 |
| 5,764,889 * | 9/1998 | Ault et al. | 395/186 |
| 5,941,950 * | 8/1999 | Hwang et al. | 709/227 |
| 6,006,266 * | 12/1999 | Murphy, Jr. et al. | 709/227 |
| 6,049,820 * | 4/2000 | Murphy, Jr. et al. | 709/203 |

* cited by examiner

METHOD AND APPARATUS FOR TRANSFERRING FILE DESCRIPTORS IN A MULTIPROCESS, MULTITHREADED CLIENT/SERVER SYSTEM

CROSS REFERENCE TO RELATED APPLICATION(S)

This application is related to the following commonly owned, concurrently filed application(s), incorporated herein by reference:

J. D. Aman et al., "Method and Apparatus for Controlling the Number of Servers in a Client/Server System", Serial No. 08/828,440.

D. F. Ault et al., "Method and Apparatus for Controlling the Assignment of Units of Work to a Workload Enclave in a Client/Server System", Ser. No. 08/825,304.

BACKGROUND OF THE INVENTION

1. Field of the Invention

This invention relates to the transfer of file descriptors, in particular socket descriptors, from a first server process to a second server process, in particular, to a thread running in one of multiple server processes in a multiprocess, multithreaded client/server system.

2. Description of the Related Art

Client/server systems are well known in the field of data processing. In a client/server system, a client process issues a request to a server process to perform a service for it. In response, the server transmits a reply to the client, notifying it of the results of the service.

There are many existing server applications which developers want to be able to execute on server systems of different capacities. These server applications need to scale with the size of the computer they are running on. The present invention addresses the problem of how to support thousands of concurrent requests to a server.

There are two existing models for supporting many clients making requests to servers. The first model has the server create a separate process or address space for each client (typically with a fork( ) or spawn( ) system call). The second model has the server create a separate thread or task for each client (as with a pthread_create( ) system call). Each of these models has its problems.

The process model suffers from several disadvantages. Creating each process tends to result in a lot of system overhead. Once created, each process also consumes significant system resources such as storage. An operating system generally has limits on how many processes it can support. For many client/server relationships, a client is idle for long periods. In this situation it is an unacceptable waste of resources to tie up an address space for the client. In the process model, the server typically establishes a connection to the client by establishing a socket connection. The socket is represented by a socket descriptor which is inherited by the child process on a fork( ) or spawn( ) system call.

For the threading model, there are different problems. The number of threads that can be supported in a single process can be limited by several factors. The storage consumed by a thread and serialization between threads are the major limitations. In the threading model, the main thread in the server typically establishes a connection to the client by establishing a socket connection. The socket is represented by a socket descriptor which is shared by all the threads in the server process.

As a specific example of the general problem, consider a system that can support 400 processes, each of which can support a maximum of 200 threads. If the server needs to support 4000 clients, then neither the process model nor the thread model are sufficient.

In order to solve this problem, it is necessary to distribute the workload across multiple processes. These processes act as an extension to the initial server. In order to distinguish which process is being discussed, the initial server is called the "listening daemon", since its job is to listen for client connections. The processes which perform the client work are simply called "server processes" or just "servers".

In the above example, one would end up with a listening daemon and 20 servers each running 200 threads. In this arrangement, one can vary the number of servers and the number of threads in each server to achieve optimum performance.

The fork( ) and spawn( ) services for creating a new process and the pthread_create( ) service for creating a new thread provide for the mechanism to either pass or share a file descriptor, including those representing a socket. However, these services are unavailable if a server space has been created before the connection to the client is established, as in the environment of the present invention. A new mechanism is therefore needed for a listening daemon to pass the connection to the thread where the client request will be run.

This problem has been previously solved, but in a manner that provides unacceptable performance in certain environments. Thus, in one method the listening daemon accepts a conversation. It then uses some workload balancing algorithm to determine where the client should really be connected. In this case, each server may own a separate port. The listening daemon then sends a response back to the client telling it to reconnect to a particular port which gets the client to an available server.

Another method requires that the listening daemon maintain a separate communication path (pipe) to each server. When the listening daemon receives a connection request, it needs to pass information to the selected server. The listening daemon then breaks the connection to the client, while the server reestablishes the connection.

In both of the methods described, there is double the overhead in establishing a connection between the client and the server that actually performs the work. In some servers, this is acceptable, since the servers are connection oriented. That means that the server maintains the connection to the client for a long period of time in comparison to the overhead necessary to establish the connection. Other client/server systems, however, use a transactional model. In this model, the client makes a request which establishes a connection only for the duration of the single request. The World Wide Web is an example of a transactional model. In the transactional model, the overhead of the double connection can easily be more that the overhead of running the transaction.

A better method is needed to handle the transfer of a socket connection from a listening daemon to a server that is running a transaction model.

SUMMARY OF THE INVENTION

In accordance with the present invention, a listening daemon accepts a client request and places the request on a queue which is served by a workload manager. The workload manager starts additional servers on demand. The servers start multiple threads to perform work for clients.

Each thread in the server pulls a work request from the work queue. The services used to queue and dequeue the work requests provide the mechanism for transferring the socket from the listening daemon to the thread running in the server.

This model eliminates the need for the listening daemon to manage the server address spaces and eliminates as well the need to connect to the client multiple times before the work can be started. For a transactional model, this provides superior performance to existing methods.

DESCRIPTION OF THE PREFERRED EMBODIMENTS

Some of the terminology used in this specification, while fairly standard in the art, is explained below for ready reference.

A file descriptor is a small integer used by a process to identify a file or similar object that has been opened by it for input/output (I/O). Certain file descriptors are generally reserved, such as 0 for standard input, 1 for standard output, and 2 for standard error. Thus, the first file opened by a process may be assigned a descriptor of 3, the second file is assigned a descriptor of 4, and so on. The file descriptor is an index into a file descriptor table that is maintained for a particular process and which contains pointers to other data structures (e.g., vnodes) containing file access information. (In the present application, as will be apparent, the term "file descriptor" is also used as a shorthand reference to the table entry itself, to which the index points.) When a process closes a file, the descriptor formerly assigned to that file becomes available for assignment to a subsequently opened file. File descriptors are unique to a process, so that a file that has been opened by several processes may be assigned a different descriptor for each process. File descriptors are well known in the art and are described further at page 28 of W. R. Stevens, UNIX Network Programming, 1990, incorporated herein by reference.

A socket is a programming construct at each end of a communications connection that allows a first process to communicate with a second process at the other end of the communications connection, usually on a remote machine. Each process communicates with the other process by interacting directly with the socket at its end of the communication connection. Processes open sockets in a manner analogous to opening files, receiving back a file descriptor (specifically, a socket descriptor) by which they identify a socket. Sockets are likewise well known in the art and are described at length at pages 258–341 of the above-identified work of W. R. Stevens, as well as at pages 292–293 of A. S. Tanenbaum, Modern Operating Systems, 1992, incorporated herein by reference.

Figure 1:
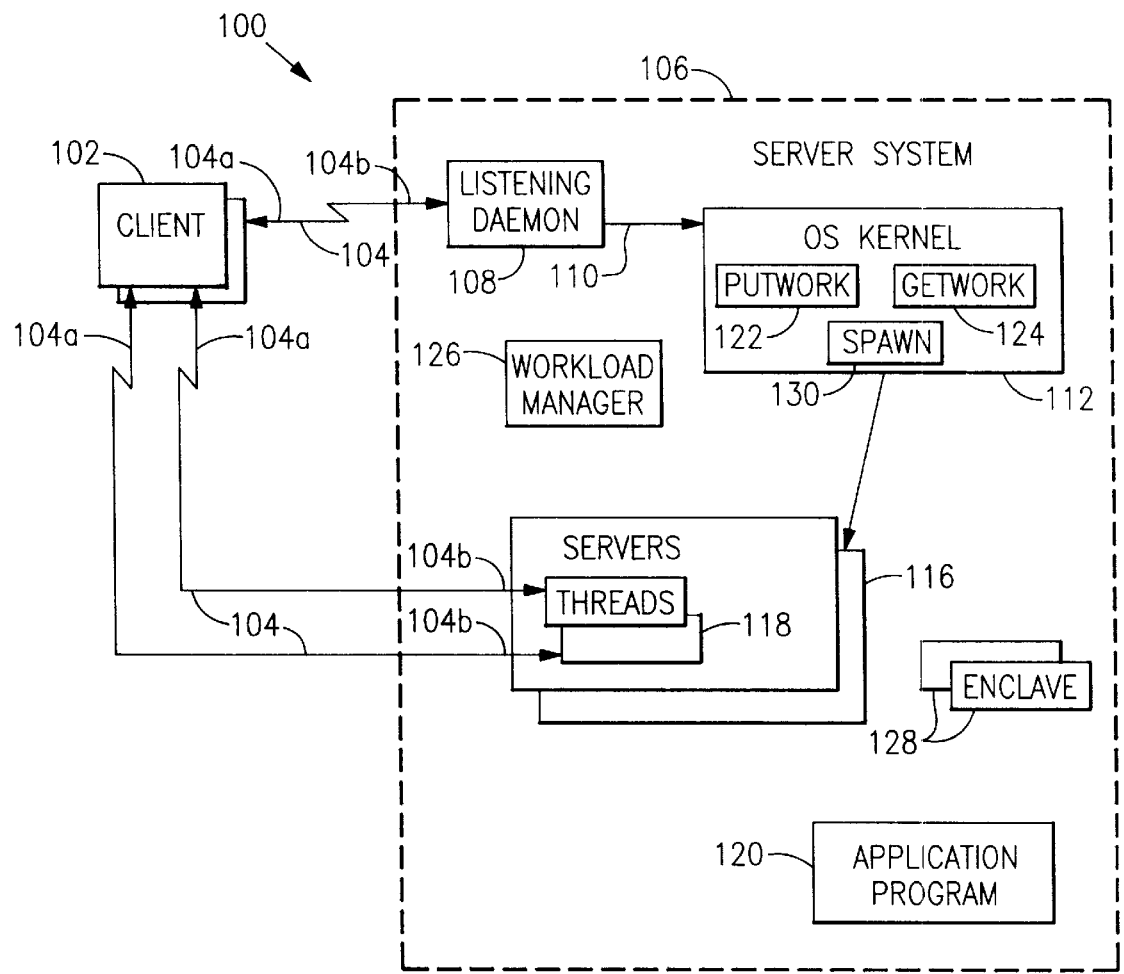
FIG. 1 is a schematic block diagram of a client/server system incorporating the present invention.

Referring to FIG. 1, an exemplary client/server system 100 incorporating the present invention includes one or more clients 102, each of which is connected to a server system 106 via a communications connection 104. Communications connection 104 may be managed by any suitable communications protocol such as TCP/IP. Server system 106 comprises one or more listening daemons 108, each of which is serviced by one or more server processes (or simply "servers") 116.

Communications connection 104 couples a particular client 102 to a particular server process in server system 106 (either a listening daemon 108 or a server process 116, as will be described) via respective sockets 104a and 104b at the client and server ends that the processes identify with socket descriptors. (In view of this one-to-one correspondence between a communications connection 104 and its sockets 104a–104b, the terms "communications connection" and "socket" are sometimes used interchangeably herein).

Listening daemon 108 distributes work to servers 116 through respective putwork( ) and getwork( ) services 122 and 124 provided by an operating system (OS) kernel 112. OS kernel 112 may comprise the kernel portion of the IBM® OS/390™ operating system, running on a server system 106 comprising an IBM System/390® (S/390®) server, although the invention is not limited to any particular hardware or software platform. OS kernel 112 creates additional servers 116 based on demand and installation policy. Each client request is eventually serviced by a thread 118 running in a server 116, via a communication connection 104 and server-end socket 104b that has been transferred from the listening daemon 108 to the thread 118 in a manner to be described. Any suitable means may be used to control the creation of multiple threads 118 in multiple server address spaces 116; the particular means used form no part of the present invention.

System 106 also contains a workload manager (WLM) 126, programming that is associated with OS kernel 112. Workload manager 126 works in conjunction with a system resource manager (not separately shown) to control the allocation of system resources to various service classes into which units of work are classified in accordance with how the service classes are meeting predefined goals. The operation of workload manager 126, while forming no part of the present invention, is described in more detail in U.S. Pat. No. 5,473,773 to J. D. Aman et al., entitled "Apparatus and Method for Managing a Data Processing System Workload According to Two or More Distinct Processing Goals"; the copending application of C. K. Eilert et al., Ser. No. 08/383, 168, filed Feb. 3, 1995, entitled "Apparatus and Method for Managing a Distributed Data Processing System Workload According to a Plurality of Distinct Processing Goal Types"; and the concurrently filed application of J. D. Aman et al., Serial No. 08/828,440, identified in the above cross-reference to related applications, all of which are incorporated herein by reference.

The present invention relates to the procedure used to transfer a socket 104b (and hence the corresponding communications connection 104) from a listening daemon 108 to a thread 118 running in a server 116. This socket transfer at the server end is transparent to the client 102, whose socket 104a operates in a conventional manner.

Figure 2:
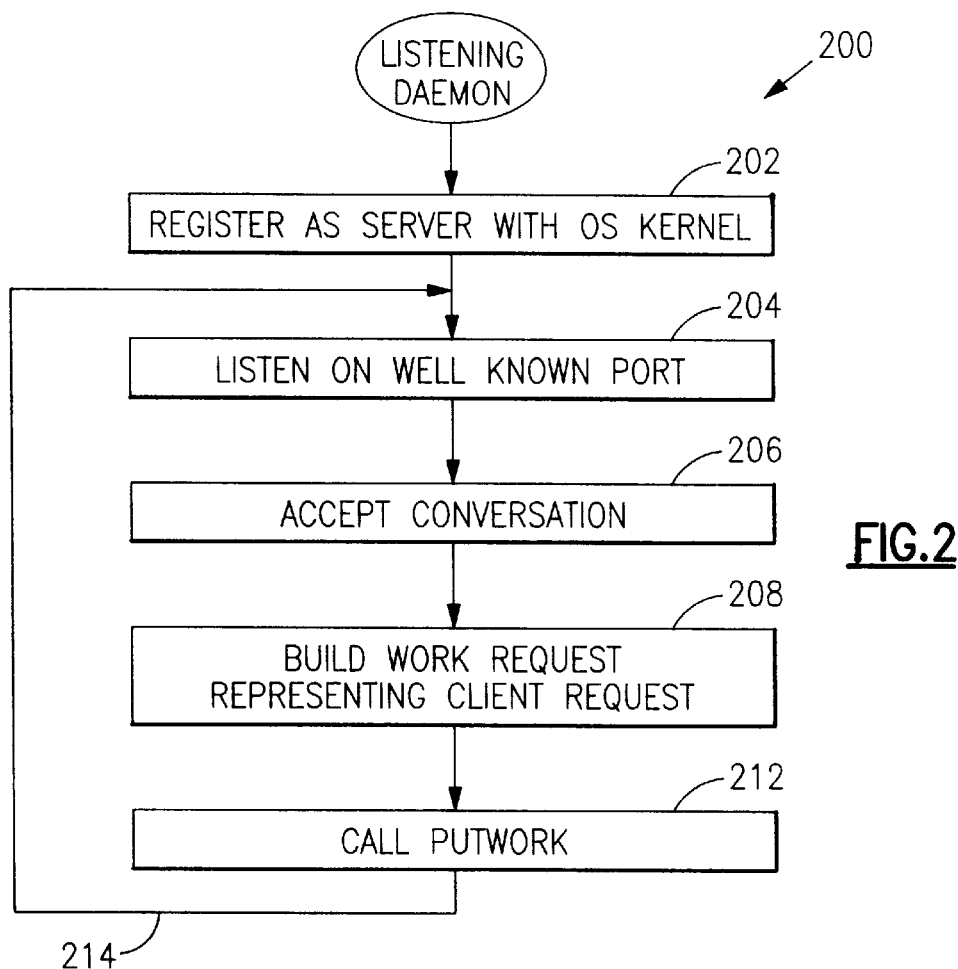
FIG. 2 shows the processing done in the listening daemon.

FIG. 2 shows the procedure 200 followed by listening daemon 108. Listening daemon 108 first registers as a server with the OS kernel 112 (step 202). When a similar step is taken by the servers 116, it allows the OS kernel 112 to accept work from the listening daemon 108 and dispatch the work on the appropriate server 116.

The listening daemon 108 then enters an endless loop where it waits for input on a communications port 104 (step 204). When the listening daemon 108 accepts a conversation (step 206), it receives a socket descriptor identifying the socket 104b which is used for all future communications with the client 102. In a UNIX®-compliant system such as OS/390, steps 204 and 206 are accomplished via listen( ) and accept( ) system calls to the OS kernel 112 in a manner well known in the art.

Listening daemon 108 then builds a set of putwork( ) parameters 300 (FIG. 3) representing the client request (step 208). The work request consists of any data that the listening daemon 108 needs to pass to the server 116 as well as any file descriptors (including socket descriptors) that need to be transferred to the server. Frequently, the only file descriptor that needs to be transferred to the server 116 is the one that represents the socket 104b.

Listening daemon 108 then calls the putwork( ) service 122 of the OS kernel 112, passing to it the putwork( ) parameters 300 (FIG. 3) representing the work request (step 212). The processing steps performed by the putwork( ) service 122 are shown in FIGS. 4A and 4B and are described below.

The parameter processing performed in steps 208 and 212 is similar in some respects to that done in a standard UNIX function called spawn( ), a modified version of which is described below. The spawn( ) function allows a first process (such as a listening daemon) to create a new process to which is passed data and replicate file descriptors for the new process. However, the spawn( ) function builds a new process, which entails significant overhead for the OS kernel 112.

After passing the work request to the putwork( ) service 122 of the OS kernel 112, the listening daemon 108 loops back (step 214) to wait for another request from a client 102.

Figure 3:
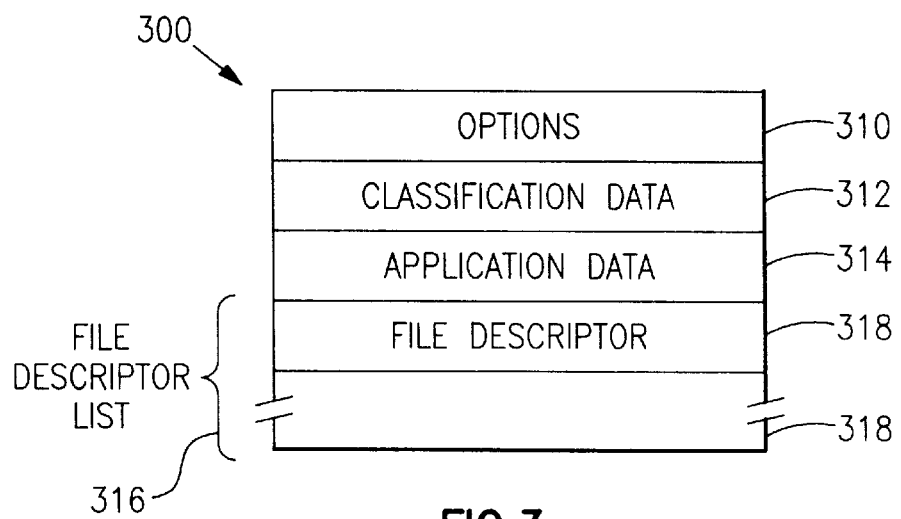
FIG. 3 describes the information which is passed by the listening daemon on the putwork( ) kernel call.
Figure 4A:
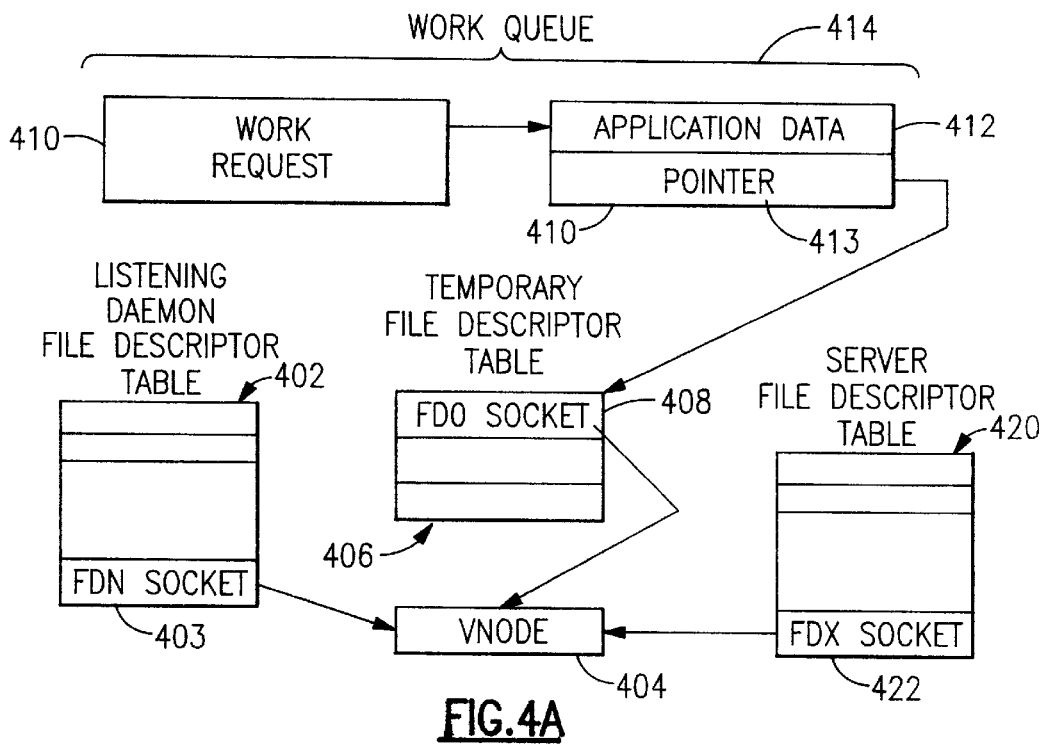
FIG. 4A shows the file descriptor tables and work queues that are used by the present invention.
Figure 4B:
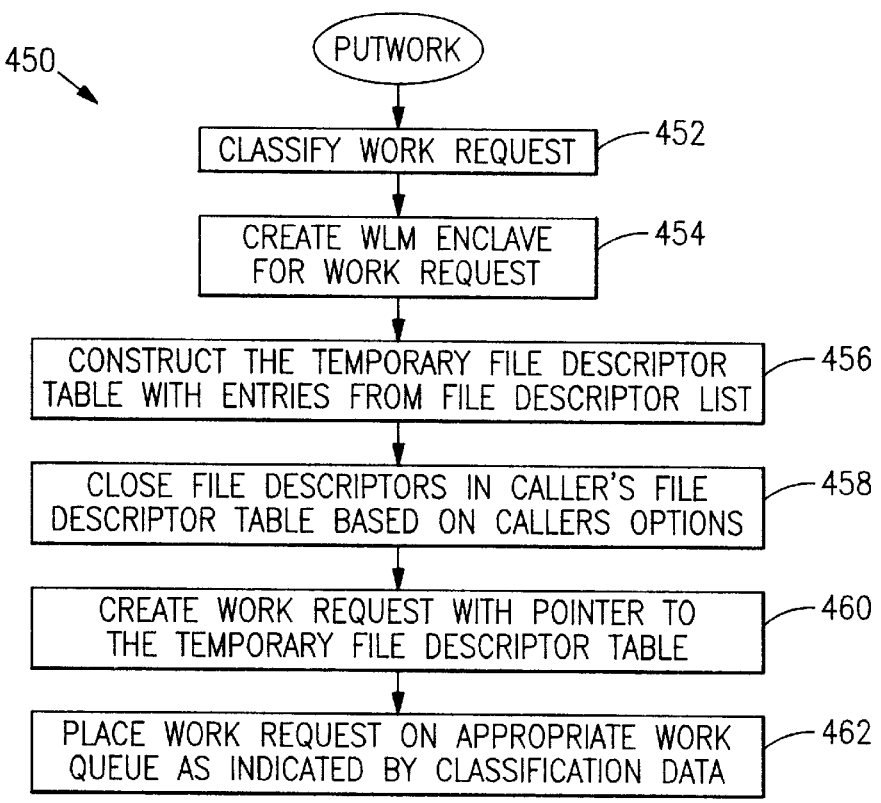
FIG. 4B shows the steps performed by the putwork( ) service of the present invention.

FIG. 3 shows the set of putwork( ) parameters 300 that a listening daemon 108 assembles to represent a client's work request. Options 310 allow the listening daemon 108 to request that the putwork( ) service 122 close the file descriptor after it has been transferred to the server 116. This avoids the overhead of requiring the listening daemon 108 to make a separate call to close the socket 104b. The next parameter consists of classification data 312, used by the OS kernel 112 to identify the correct server 116 to handle the work. Application data 314 allows the listening daemon 108 to pass any parameters it wants to the thread 118 that executes the client request in a server 116.

File descriptor list 316 contains one or more file descriptors 318 (i.e., indices into a file descriptor table) that the listening daemon 108 wants to transfer to the server 116. As noted above, frequently only a single file descriptor 318, representing the socket 104b that provides the communications connection 104 to the client 102, is passed.

Referring to FIG. 4A, in a manner that is well known in the art, each process on server system 106, including listening daemon 108 and server processes 116, has a file descriptor (FD) table associated with it that is used to keep track of all open files or other objects such as sockets 104b representing communications connections 104. Thus, listening daemon 108 has a file descriptor (FD) table 402.

When a socket 104b is created, the OS kernel 112 builds a virtual node (vnode) 404 to represent the socket. The OS kernel 112 then scans the file descriptor table of the process for which it is creating the socket 104b, in this case file descriptor table 402, for an available slot. Assuming slot N is the first available slot in file descriptor table 402, OS kernel 112 stores a pointer 403 in slot N that points to vnode 404. (This pointer 403, and not the index N into the table 402, is the thing that is transferred to a server process 116.) From the point of view of the listening daemon 108, the pointer 403 indexed by N (where N is the file descriptor 318 returned to the process) represents socket 104b and thus its connection 104 to the client 102. The real information needed to perform communication with the client 102 is stored in the vnode 404.

In a similar manner, each server process 116 in the operating system has its own file descriptor table 420. Threads 118 within a server process 116 share a common file descriptor table 420, since a file or other object that is open to one thread in a process is open to all.

FIG. 4B shows the procedure 450 performed by the putwork( ) service 122 when processing a putwork( ) request (step 212) from a listening daemon 108.

The putwork( ) service 122 first classifies the work request based on the classification data 312 supplied by the listening daemon 108 (step 452). After classifying the work request, the putwork service 122 creates a workload manager (WLM) enclave 128 to represent the work request (step 454). As described in MVS Programming: Workload Management Services, IBM publication GC28-1773-00, 1996, incorporated herein by reference, at pages 39–44, an enclave 128 defines a set of resource users (such as threads or processes) that are managed as a single entity for the purpose of resource allocation. This establishes the business unit of work relationship between the work request and the WLM enclave 128.

Enclaves are also discussed in the commonly assigned copending application of S. J. Greenspan et al. entitled "Separating Work Unit Priority and Accountability from Address Spaces", Ser. No. 08/768,038, filed Dec. 17, 1996, incorporated herein by reference.

The particular data structures used to associate the units of work described herein with a particular enclave and manner in which workload manager 126 and related system elements allocate resources to units of work that are associated with a particular enclave 128 as a single "business unit of work" form no part of the present invention. Any of various data structures or allocation schemes could be used, such as the ones described in the references cited above.

Next, the putwork( ) service 122 makes a copy of the user-supplied parameters and file descriptors so they can be made available to a worker thread 118 when it obtains the work request. Thus, referring also to FIG. 4A, the putwork( ) service 122 constructs a temporary file descriptor table 406 (step 456). Each file descriptor 318 in the caller's file descriptor list 316 (FIG. 3) has its corresponding entry 403 in file descriptor table 402 replicated in this temporary file descriptor table 406 so that it has a corresponding entry 408 in the temporary file descriptor table.

After the file descriptors 408 have been captured in the temporary file descriptor table 406, the descriptors 403 in the listening daemon table 402 are closed (i.e., deleted from table 402) if the caller has specified this in its options 310 (step 458).

After all file descriptors 403 have been processed and replicated in the temporary file descriptor table 406, the putwork( ) service 122 creates a work request 410 which contains application data 412 (=application data 314 from the parameter list 300) and a pointer 413 to the temporary file descriptor table 406 for that work request (step 460). This work request 410 is then placed on the appropriate work queue 414 as indicated by the classification data 312 (step 462).

When a getwork( ) request later occurs from a thread 118 running in a server 116, the getwork( ) service 124 performs another set of file descriptor transfers. First, the getwork( ) service 124 scans the file descriptor table 420 of the server 116. For each entry 408 in the temporary file descriptor table 406, a new entry 422 is replicated in the server 116's file descriptor table 420. When this step is complete, the server 116, and hence its threads 118, has access to the same files or communication links (i.e., sockets) that the listening daemon 108 had.

Figure 5A:
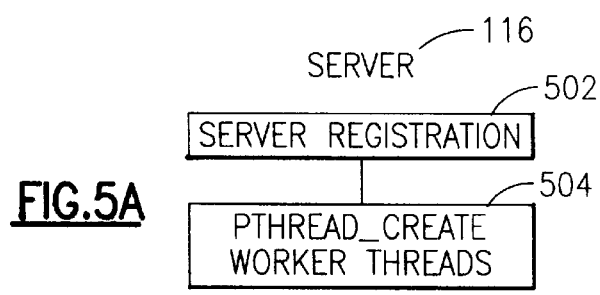
FIG. 5A shows the processing steps performed by each server process.
Figure 5B:
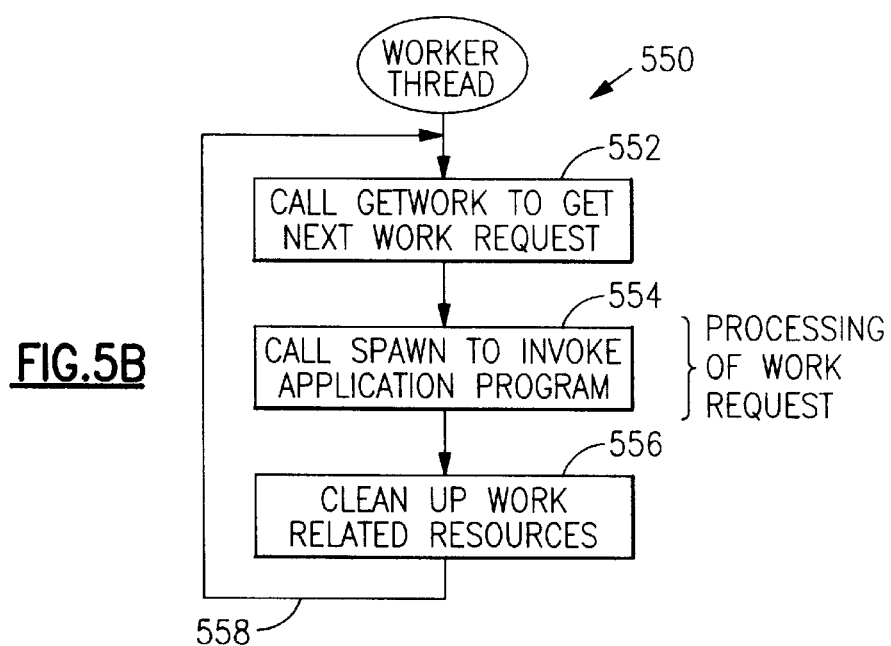
FIG. 5B shows the processing steps performed by each worker thread created by a server process.

FIGS. 5A–5B show the processing that is done by a server 116 and its worker threads 118. Referring to FIG. 5A, when a server 116 is started, it calls a server registration service in a manner similar to that of the listening daemon 108 (step 502). This provides the OS kernel 112 with the information needed to bind the work queue 414 to the listening daemon 108 that adds elements and the server 116 that removes them. The server 116 then issues a pthread_create( ) system call to the OS kernel 112 to create multiple worker threads 118 (step 504).

Figure 6:
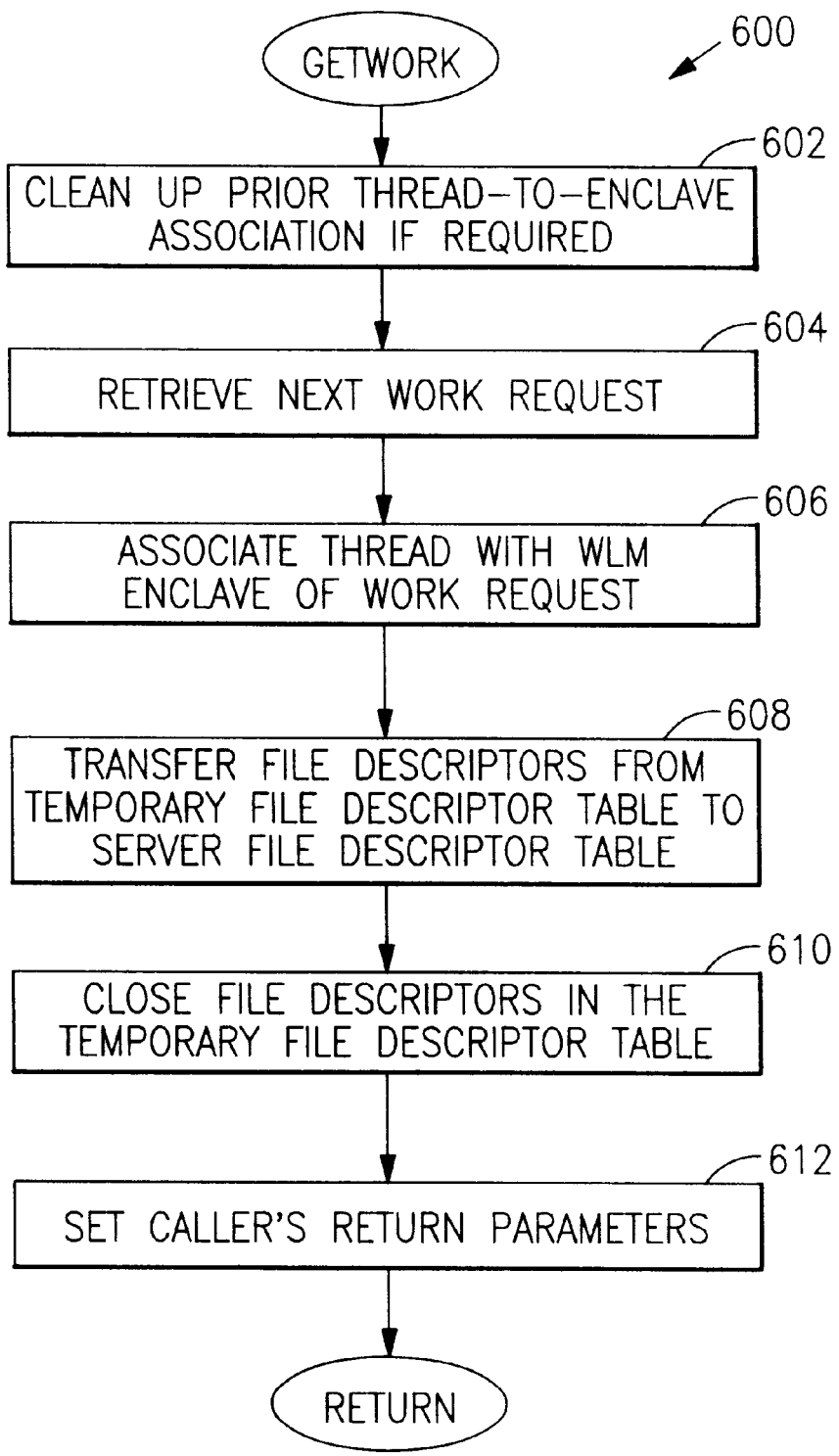
FIG. 6 shows the steps performed by the getwork( ) service of the present invention.

FIG. 5B shows the procedure 550 followed by each worker thread 118 created by a server process 116. Referring to FIG. 5B, each worker thread 118 upon being created calls the getwork( ) service 124 to request the next piece of work 410 from a client 102 (step 552). The operation of the getwork( ) service 124 is shown in FIG. 6 and explained further below. The thread 118 receives one or more file descriptors (i.e., pointers to a vnode) 422 from the getwork( ) service 124, which the thread uses to process the work request 410 and communicate back to the client 102.

In this particular example, after retrieving a work request 410 the worker thread 118 determines that the work request requires the invocation of a separate application program 120 (FIG. 1). To invoke the application program 120, thread 118 calls a spawn( ) service 130 of the OS kernel 112, the operation of which is described below (step 554).

When a work request 410 is completed, the thread 118 cleans up any required resources related to the processed work request; this includes closing any file descriptors 422 related to the work request 410 by deleting them from the descriptor table 420 (step 556). The thread 118 then loops back (step 558) to step 552 to perform the next getwork( ) call.

FIG. 6 shows the procedure 600 performed by the getwork( ) service 124 of OS kernel 112 (FIG. 1) upon being called by a worker thread 118 (step 552 of FIG. 5B).

When called again by a worker thread 118 at the completion of a previously obtained work request 410, the getwork service 124 first attempts to clean up the association between the old WLM enclave 128 and the calling worker thread 118 (step 602). Since the previous work request 410 has been completely processed by the worker thread 118, the WLM enclave 128 is no longer relevant. Therefore, as part of the cleanup processing, the old WLM enclave 128 is deleted, which indicates to the system 106 the end of the previous work request 410.

The getwork( ) service 124 then attempts to retrieve the next work request 410 from the work queue 414 (step 604).

If no work is available, the worker thread 118 is suspended in a manner well known in the art until more work arrives.

Next, the getwork( ) service 124 associates the dispatchable work unit comprising the calling worker thread 118 with the new WLM enclave 128 created for the work request 410 to establish the business unit of work relationship between the calling worker thread and that new WLM enclave 128 (step 606).

Upon retrieving the next work request 410, and as described above with respect to FIGS. 4A–4B, the getwork( ) service 124 transfers file descriptors 408 from the temporary file descriptor table 406 to the file descriptor table 420 of the server 116 (step 608).

After the file descriptor transfer is complete, the file descriptors 408 in the temporary file descriptor table 406 are closed and the temporary file descriptor table 406 is freed (step 610).

Finally, the getwork( ) service 124 informs the calling thread 118 (by setting appropriate return parameters) which file descriptors 422 are available for it to use (step 612).

Figure 7:
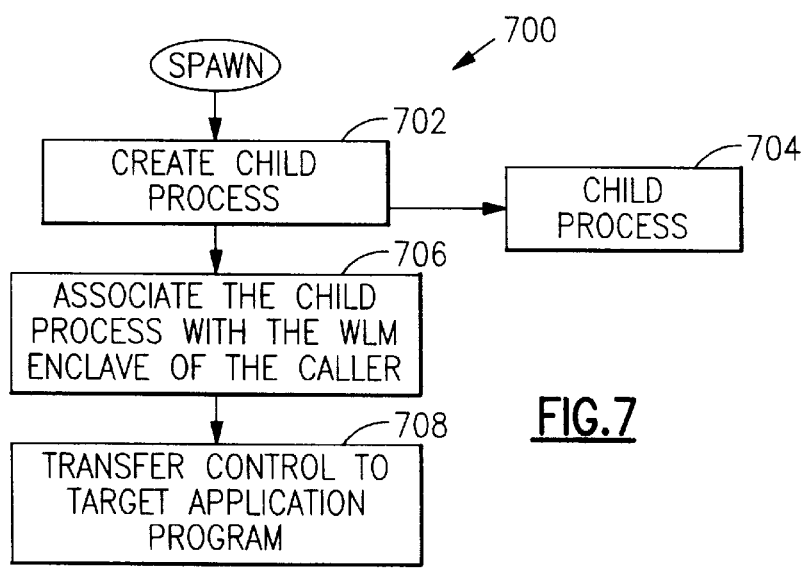
FIG. 7 shows the steps performed by the spawn( ) service of the present invention.

FIG. 7 shows the procedure 700 followed by the spawn( ) service 130. The spawn( ) service 130 first creates a new child process 704 constituting an instance of the application program 120 (step 702). The child process 704 inherits many of the parent's process attributes as part of the child creation processing.

After creating the child process 704, the spawn( ) service 130 associates the child process with the WLM enclave 128 of the worker thread 118 that called the spawn( ) service (step 706). This establishes the business unit of work relationship between the new child process 704 and the work request 410.

Finally, the spawn( ) service 130 transfers control to the target application program (step 708). When the target application program terminates, its association with the WLM enclave 128 is broken.

The invention is preferably implemented as software (i.e., a machine-readable program of instructions tangibly embodied on a program storage devices) executing on one or more hardware machines. While a particular embodiment has been shown and described, various modifications will be apparent to those skilled in the art. Thus, while the description has been with reference to a UNIX-compliant system, the present invention is not limited to such systems and may be used in any system in which similar constructs are used.

What is claimed is:

1. In a client/server system in which a first server process accepts an incoming work request from a client, said incoming work request specifying work to be performed by a second server process and having a descriptor associated therewith, said first and second server processes having first and second descriptor tables respectively associated therewith, a method of transferring said descriptor from said first server process to said second server process, comprising the steps of:

in response to a request from said first server process, adding said work request to a queue of incoming work requests to enqueue said request and copying the descriptor associated with said enqueued work request from said first descriptor table to a temporary descriptor table associated with said enqueued work request;

in response to a request from said second server process for more work, removing a work request from said queue to dequeue said request and copying the descriptor associated with said dequeued work request from the temporary descriptor table associated with said dequeued work request to said second descriptor table.

2. The method of claim 1 in which said first server process is a listening daemon.

3. The method of claim 1 in which said descriptors are socket descriptors.

4. The method of claim 1 in which said enqueuing step includes the step of deleting said descriptor from said first descriptor table after copying said descriptor to said temporary descriptor table.

5. The method of claim 1 in which said dequeuing step includes the step of deleting said descriptor from said temporary descriptor table after copying said descriptor to said second descriptor table.

6. The method of claim 1 in which said client/server system has a plurality of second server processes, each of which has a descriptor table associated therewith.

7. The method of claim 1 in which said second server process has a plurality of concurrently executing threads, said request for more work originating from one of said threads.

8. The method of claim 1 in which said enqueuing step is performed by an operating system kernel in response to a system call from said first server process.

9. The method of claim 1 in which said dequeuing step is performed by an operating system kernel in response to a system call from said second server process.

10. A program storage device readable by a machine, tangibly embodying a program of instructions executable by the machine to perform the method steps of claim 1.

11. In a client/server system in which a first server process accepts an incoming work request from a client, said incoming work request specifying work to be performed by a second server process and having a descriptor associated therewith, said first and second server processes having first and second descriptor tables respectively associated therewith, apparatus for transferring said descriptor from said first server process to said second server process, comprising:

enqueuing means responsive to a request from said first server process for adding said work request to a queue of incoming work requests to enqueue said request and copying the descriptor associated with said enqueued work request from said first descriptor table to a temporary descriptor table associated with said enqueued work request; and dequeuing means responsive to a request from said second server process for more work for removing a work request from said queue to dequeue said request and copying the descriptor associated with said dequeued work request from the temporary descriptor table associated with said dequeued work request to said second descriptor table.

12. The apparatus of claim 11 in which said enqueuing means includes means for deleting said descriptor from said first descriptor table after copying said descriptor to said temporary descriptor table.

13. The apparatus of claim 11 in which said dequeuing means includes means for deleting said descriptor from said temporary descriptor table after copying said descriptor to said second descriptor table.

* * * * *